Patented July 13, 1943

2,324,255

UNITED STATES PATENT OFFICE 2,324,255

SEPARATION OF KETONES AND MONO-HYDRIC ALCOHOLS FROM MIXTURES THEREOF

Edgar C. Britton, Howard S. Nutting, and Lee H. Horsley, Midland, Mich., assignors to The Dow Chemical Company, Midland, Mich., a corporation of Michigan No Drawing. Application April 17, 1940, Serial No. 330,206

12 Claims. (Cl. 202—42)

This invention concerns a method of separating from mixtures thereof alcohols and ketones which ordinarily form azeotropes with one another during distillation. It has particular reference to the separation of individual alcohols and ketones from the fractions of pyroligneous acid containing the same.

Pyroligneous acid as ordinarily obtained by the destructive distillation of wood comprises a complex mixture of organic acids, alcohols, esters, ketones, etc., each of which would be valuable if it could be isolated in sufficiently pure form for sale. Certain of the products, e. g. acetic acid and methanol, are distilled from the crude mixture and constitute important commercial commodities from the wood distilling industry. However, the alcohols and ketones present in the starting material form a series of positive azeotropes with one another so that complete recovery of the individual compounds is not obtained by present manufacturing processes. By a "positive" azeotrope is meant an azeotrope having a boiling point below that of any of its components.

Examples of azeotropic mixtures of alcohols and ketones obtained from pyroligneous acid or fractions thereof by distillation at atmospheric pressure are: an azeotrope containing about 12 per cent by weight of methanol and 88 per cent of acetone which distills at approximately 55.7° C.; an azeotrope of about 70 per cent methanol and 30 per cent methyl ethyl ketone which distills at about 63.5° C.; an azeotrope of 40 per cent ethanol and 60 per cent methyl ethyl ketone which distills at about 74.8° C.; an azeotrope of normal propyl alcohol and methyl propyl ketone which distills at about 95.1° C.; etc. Such azeotropic mixtures are, in most instances, less valuable than the individual compounds of which they are composed and their formation during distillation reduces considerably the yields of individual alcohols and ketones from pyroligneous acid. It is an object of this invention to provide a simple method whereby any mixture of an alcohol and a ketone which tends to form an azeotrope may be resolved to recover its individual components in a good state of purity.

We have discovered that the azeotropes of alcohols with ketones change in composition as the pressure on the distilling system is varied, and that with any such system there is at least one pressure below the critical pressure of the mixture at which azeotropism ceases and the mixture may be fractionally distilled to separate its individual components. With each of the ordinarily azeotropic mixtures of alcohols and ketones which we have studied, we have found there to be a range of superatmospheric pressures at which the mixture can be fractionally distilled without azeotropism occurring. With certain of such mixtures of an alcohol and a ketone we have found that there is also a range of subatmospheric pressures at which fractional distillation may be carried out without azeotropism occurring. It will be apparent that the pressure and the corresponding temperature at which the fractional distillation is carried out are within the limits of the freezing point and the critical pressure of the mixture, since it is only within these limits that distillation is possible.

We have found that as the pressure applied during careful fractional distillation of an ordinarily azeotropic mixture of an alcohol and a ketone is increased above, or reduced below, atmospheric pressure until it closely approximates that at which azeotropism ceases, the material distilling becomes richer in that component which will distill as the lower boiling fraction upon further change in the pressure to the point where azeotropism no longer occurs. However, with those ordinarily azeotropic mixtures of alcohols and ketones which may be rendered non-azeotropic either by distillation under vacuum or by distillation at superatmospheric pressure, we have further observed that, whereas the ketone component distills first during fractional distillation under vacuum, it is the last component to distill when the same system is fractionated at superatmospheric pressure. For instance, we have found that a mixture of methanol and acetone may be fractionally distilled without occurrence of azeotropism either at absolute pressures below approximately 1–2 pounds per square inch or above about 350 pounds per square inch, although azeotropism does occur during distillation at pressures between said limits. When this mixture is fractionally distilled at an absolute pressure below 1 pound per square inch, acetone is the first component to distill. However, when the same mixture is fractionated by distillation at an absolute pressure above 350 pounds per square inch, methanol is the first component to distill. In the commercial fractionation of such mixture, the decision as to whether the distillation may most advantageously be carried out under vacuum or at superatmospheric pressure is dependent in part upon the proportions of alcohol and ketone in the mixture. If a solution of acetone and only a minor proportion of methanol is to be fractionated, the distillation is advantageously carried out at a pressure above 350 pounds per square inch, absolute, since then only the minor proportion of methanol (and usually a small intermediate fraction) need be distilled in order to separate the components. If the mixture of methanol and acetone contains the latter in minor proportion, it may be advantageous to carry the fractionation out under vacuum so as to collect the acetone in the first fractions of distillate and thereby avoid necessity for distilling more than a small amount of the methanol.

The operative pressure above or below atmospheric pressure which must be applied in order to fractionally distill only one component of an alcohol-ketone mixture capable of forming an azeotrope is dependent upon the particular alcohol and ketone present. However, any such mixture may readily be fractionally distilled to recover the individual components by changing the pressure away from atmospheric pressure during the distillation until one component only, instead of an azeotropic mixture, distills. After having thus determined the applied pressure necessary to permit complete fractional distillation of a mixture of a given alcohol and a given ketone, subsequent fractional distillations of any mixtures of those two compounds may advantageously be carried out at the determined pressure or at other pressures more remote from that at which azeotropism occurs than the pressure so determined. The ease and efficiency of fractionation becomes greater as the pressure applied to the distilling system is changed away from the pressure range over which azeotropism occurs. For this reason, the pressure which we apply during fractional distillation of an ordinarily azeotropic alcohol-ketone mixture at superatmospheric pressure is preferably at least 50 pounds per square inch above that at which azeotropism ceases.

As just pointed out, the separation of an alcohol and a ketone from a mixture thereof which forms an azeotrope when distilled at atmospheric pressure, is accomplished most efficiently by changing the applied pressure during the distillation away from atmospheric pressure to a point at which azeotropism no longer occurs and one component may be distilled from the other. Such mode of operation sometimes involves fractional distillation at pressures in the neighborhood of 200 pounds per square inch or higher. The separation may be effected without employing such high distilling pressures by distilling the mixture in stages as follows. A mixture of an alcohol and a ketone corresponding in composition to the azeotrope which they form when distilled together at atmospheric pressure may be fractionally distilled at a moderately elevated pressure or under vacuum to separate as the distillate an azeotropic mixture having a composition different from that formed when the distillation is carried out at atmospheric pressure; thus leaving, as residue from the distillation or as the higher boiling fraction of the distillate, an excess of one of the compounds, e. g. the alcohol, in purified form. The azeotropic mixture collected in the distillate may then be redistilled at a pressure different from that employed in the first distillation, e. g. at atmospheric pressure, to distill off another azeotropic mixture and leave a portion of the other compound, e. g. the ketone, in purified form. Such redistillations may be continued (with change in the applied pressure from one distillation to the next) until the entire mixture is resolved into its individual components.

The following examples illustrate certain ways of applying the principle of the invention, but they are not to be construed as limiting it.

EXAMPLE 1

In a series of experiments, mixtures of alcohols and ketones which form azeotropes during distillation at atmospheric pressure or thereabout were heated under reflux in a still provided with an efficient distilling column until a condition of equilibrium between the liquid and vapor phases of the system had been established. Slow distillation was then started and the pressure on the distilling system was gradually changed away from atmospheric pressure until a pressure was reached at which azeotropism ceased and a single component could be fractionally distilled. The following table names the components of each mixture tested in this manner, gives approximately the pressure or pressures at which azeotropism ceased in each instance, and names the component which distills first from the mixture at the pressure required to prevent azeotropism.

Table I

| System distilled | Conditions when azeotropism ceases | |
| --- | --- | --- |
| | Absolute pressure | Component distilling first from mixture |
| | Lbs./sq. in. | |
| Methanol; acetone | 1-2 | Acetone. |
| | 350 | Methanol. |
| Methanol; methyl ethyl ketone. | 70 | Do. |
| Ethanol; methyl ethyl ketone. | 70 | Ethanol. |
| Ethanol; methyl n-propyl ketone. | 10-15 | Do. |
| n-Propanol; methyl n-propyl ketone. | 2-5 | Methyl n-propyl ketone. |
| | 60 | Propanol. |
| Iso-propanol; methyl ethyl ketone. | 2-5 | Methyl ethyl ketone. |
| | 60 | Isopropanol. |

In the above table it will be noted that all of the alcohol-ketone systems studied, with the possible exception of the ethanol and methyl n-propyl ketone system, form an azeotrope if distilled at atmospheric pressure. The ethanol and methyl n-propyl ketone mixture forms an azeotrope when distilled under vacuum and azeotropism ceases at pressures in the neighborhood of atmospheric pressure. However, it is extremely difficult, if not impossible, to distill a single compound from the mixture at atmospheric pressure. Efficient fractionation is obtained by carrying the distillation out at an absolute pressure of about 50 pounds per square inch or higher. In this and in all other instances the ease and efficiency of fractionation increases as the pressure applied during the distillation is varied away from the range of pressures at which azeotropism occurs. The table also shows, for those alcohol-ketone systems which are capable of being fractionally distilled without azeotropism at either a range of subatmospheric pressures or a range of superatmospheric pressures, that the component which is first to distill (i. e. the lower boiling) when the fractional distillation is carried out at subatmospheric pressures is the last component to distill (i. e. the higher boiling) when the same system is fractionally distilled at superatmospheric pressure.

EXAMPLE 2

In each of a series of experiments a solution of methanol and methyl ethyl ketone in the proportions given in the following table was heated under reflux at an absolute pressure of about 210 pounds per square inch in a still provided with a suitable column until equilibrium between the liquid and vapor phases of the refluxing mixture had been attained. A small fraction of the material was then distilled and analyzed. Table II gives the per cent by weight of methanol in the methanol and methyl ethyl ketone mixture charged to the still and the per cent of methanol in the fraction distilled.

Table II

| Run No. | Per cent of methanol in— | |
|---|---|---|
| | Still charge | Distillate |
| 1 | 67 | 98 |
| 2 | 98 | 99.5 |
| 3 | 99.5 | 99.85 |
| 4 | 95 | 99.73 |
| 5 | 99 | 99.87 |

Runs 4 and 5 of the table were carried out using a more efficient distilling column than that employed in runs 1–3; the increased efficiency of fractionation thus obtained is apparent from comparison of said runs. By applying a high pressure such as that employed in the above runs and using an efficient still of either the batch distillation or continuous distillation type, a mixture of methanol and methyl ethyl ketone may, in a single distillation, readily be fractionated to recover each component as an individual compound of greater than 99 per cent purity. The mixture of methanol and methyl ethyl ketone subjected to such distillation at high pressure need not be anhydrous. When it contains water, substantially anhydrous methanol first distills leaving the water with the methyl ethyl ketone.

EXAMPLE 3

A solution of 95 per cent by weight ethanol and 5 per cent methyl n-propyl ketone was heated under reflux at 165 pounds absolute pressure in a still until a condition of equilibrium between the liquid and vapor phases of the mixture was attained. A small fraction of the material was then distilled and analyzed. It consisted of 99.64 per cent by weight ethanol and only 0.36 per cent methyl propyl ketone, showing that separation of the individual components (each in highly purified form), by distillation at the pressure employed is readily attained.

EXAMPLE 4

A solution containing 90 per cent by weight of ethanol, 5 per cent of methyl n-propyl ketone and 5 per cent of water was heated under reflux at 165 pounds pressure in a still until equilibrium between the liquid and vapor phases of the mixture was attained. A small portion of the material was then distilled and the distillate was analyzed. It consisted of 94.5 per cent by weight ethanol, 5 per cent water and 0.5 per cent methyl n-propyl ketone.

The foregoing Examples 2 and 4 show that the presence of water in an alcohol-ketone mixture does not prevent separation of the alcohol and ketone from one another by the present method.

Although the invention is particularly applicable in separating into their individual components the hereinbefore discussed mixtures of alcohols and ketones which are obtained as by-products in the wood distilling industry, it is not restricted thereto. It may be applied in separating any mixture of a monohydric alcohol and a ketone which forms an azeotrope when distilled at atmospheric pressure regardless of the source or exact composition of the mixture. For instance, it may be used in separating into its components the mixtures of alcohols and ketones which often results from the hydrogenation of ketones to produce secondary aliphatic alcohols or, conversely, from the oxidation of secondary alcohols to form ketones.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for separating one compound from a mixture of an alcohol and a ketone which is azeotropic when distilled at approximately atmospheric pressure, the step of fractionally distilling the mixture at a pressure sufficiently remote from atmospheric pressure so that there is obtained a first fraction of distillate having a composition substantially different from that of the initial mixture and so that a substantial portion of one of the components of the mixture is separated as a relatively pure compound.

2. In a method for separating one compound from a mixture of an alcohol and a ketone which forms an azeotrope when distilled at atmospheric pressure, the step of fractionally distilling the mixture at a pressure sufficiently remote from atmospheric pressure to prevent azeotrope formation and permit distillation of a single substantially pure compound from the mixture.

3. In a method for separating one compound from a mixture of a monohydric alcohol and a ketone which forms an azeotrope when distilled at atmospheric pressure, the step of fractionally distilling the mixture at a pressure sufficiently greater than atmospheric pressure to prevent azeotrope formation and permit distillation of a single substantially pure compound from the mixture.

4. In a method for separating into its components a mixture of an alcohol and a ketone which form an azeotrope when distilled at approximately atmospheric pressure, the steps which consist in fractionally distilling the mixture to separate the azeotrope from one component of the mixture, and redistilling the azeotrope so obtained at a pressure considerably different from that employed in the first distillation, whereby another azeotropic mixture, of composition different from that of the azeotrope obtained in the first distillation, distills leaving a substantial portion of one component of the mixture as a purified compound.

5. In a method for separating into its components a mixture of a monohydric alcohol and a ketone which form an azeotrope when distilled at approximately atmospheric pressure, the steps which consist in subjecting the mixture to repeated fractional distillations at pressures which in the successive distillations are alternately raised and lowered considerably, a fraction of one component of the mixture being separated as a relatively pure compound in each such distillation.

6. The method which comprises separating a single substantially pure compound from a mixture of methanol and acetone, that is substantially constant-boiling at atmospheric pressure which comprises fractionally distilling the mixture at a pressure other than between 2 and 330 pounds per square inch absolute.

7. The method of separating a mixture of methanol and acetone that is substantially constant-boiling at atmospheric pressure to recover the individual compounds in substantially pure form which comprises fractionally distilling the mixture at an absolute pressure above 330 pounds per square inch.

8. The method of separating a single substantially pure compound from a mixture of methanol and methyl ethyl ketone which comprises fractionally distilling the mixture at an absolute pressure greater than 68 pounds per square inch.

9. The method of separating a single substantially pure compound from a mixture of ethanol and methyl ethyl ketone which comprises fractionally distilling the mixture at an absolute pressure exceeding 68 pounds per square inch.

10. The method of separating a single substantially pure compound from a mixture of methanol and acetone which comprises fractionally distilling the mixture at an absolute pressure of at least 380 pounds per square inch.

11. The method of separating a single substantially pure compound from a mixture of methanol and methyl ethyl ketone which comprises fractionally distilling the mixture at an absolute pressure of at least 120 pounds per square inch.

12. The method of separating a single substantially pure compound from a mixture of ethanol and methyl ethyl ketone which comprises fractionally distilling the mixture at an absolute pressure of at least 120 pounds per square inch.

EDGAR C. BRITTON.
HOWARD S. NUTTING.
LEE H. HORSLEY.